(12) United States Patent
Studer et al.

(10) Patent No.: US 9,984,059 B2
(45) Date of Patent: May 29, 2018

(54) EVALUATING RULES APPLIED TO DATA

(71) Applicant: Ab Initio Technology LLC, Lexington, MA (US)

(72) Inventors: Scott Studer, Georgetown, MA (US); David Phillimore, Acton, MA (US); Amit Weisman, Bedford, MA (US)

(73) Assignee: Ab Initio Technology LLC, Lexington, MA (US)

( * ) Notice: Subject to any disclaimer, the term of this patent is extended or adjusted under 35 U.S.C. 154(b) by 7 days.

(21) Appl. No.: 14/495,951

(22) Filed: Sep. 25, 2014

(65) Prior Publication Data

US 2015/0095752 A1    Apr. 2, 2015

Related U.S. Application Data

(60) Provisional application No. 61/883,399, filed on Sep. 27, 2013.

(51) Int. Cl.
*G06F 17/00* (2006.01)
*G06F 17/24* (2006.01)
(Continued)

(52) U.S. Cl.
CPC .......... *G06F 17/246* (2013.01); *G06F 3/0482* (2013.01); *G06F 3/04842* (2013.01);
(Continued)

(58) Field of Classification Search
CPC ................................................ G06F 17/30507
See application file for complete search history.

(56) References Cited

U.S. PATENT DOCUMENTS 5,204,939 A  *  4/1993  Yamazaki ........... G06F 17/5045
                                                    706/47
5,615,359 A     3/1997  Yung
                        (Continued)

FOREIGN PATENT DOCUMENTS

CN           1659589        8/2005
CN         101208695        6/2008
                    (Continued)

OTHER PUBLICATIONS

International Search Report and Written Opinion, PCT/US2014/057336, dated May 28, 2015 (10 pages).

(Continued)

*Primary Examiner* — Amelia Tapp
(74) *Attorney, Agent, or Firm* — Occhiuti & Rohlicek LLP

(57) ABSTRACT

Specifying rules for processing data included in fields of elements of a dataset includes rendering user interface elements associated with a respective condition. The user interface elements include: first subsets of user interface elements, at least some of which are associated with an input value derived from at least one field, and second subsets of user interface elements, each configured to receive user input associated with a respective condition. Conditions are applied to at least a first element of the dataset based on user input received from at least some of the user interface elements, in response to receiving user input for a first user interface element associated with a first field. Instructions are generated for applying one or more selected conditions associated with fewer than all of the user interface elements, the selected conditions including at least a condition associated with the first user interface element.

46 Claims, 7 Drawing Sheets

| | Inputs | | | | Outputs |
|---|---|---|---|---|---|
| | Total Frequent Flyer Miles (750,000) | Current Frequent Flyer Miles (300,000) | Seat Class (Coach) | Seat Row (30) | Boarding Group (1) |
| 230a | >= 500,000 | | | | 1 |
| 230b | | | First | | 1 |
| 230c | >= 100,000 | >= last year's frequent flyer miles | | | 2 |
| 230d | | | Business | | 2 |
| 230e | | | else | <=10 | 2 |
| 230f | | | same | <=40 | 3 |
| 230g | | | same | <=50 | 4 |

(51) Int. Cl.
*G06F 17/30* (2006.01)
*G06F 3/0482* (2013.01)
*G06F 3/0484* (2013.01)
*G06F 3/0489* (2013.01)

(52) U.S. Cl.
CPC ........ *G06F 3/04895* (2013.01); *G06F 17/245* (2013.01); *G06F 17/30507* (2013.01)

(56) References Cited

U.S. PATENT DOCUMENTS

| | | | |
|---|---|---|---|
| 5,734,886 | A | 3/1998 | Grosse et al. |
| 5,832,497 | A | 11/1998 | Taylor |
| 5,848,393 | A | 12/1998 | Goodridge et al. |
| 5,966,072 | A | 10/1999 | Stanfill et al. |
| 6,268,853 | B1 * | 7/2001 | Hoskins ............... G05B 15/02 700/83 |
| 6,477,520 | B1 | 11/2002 | Malaviya et al. |
| 6,728,879 | B1 | 4/2004 | Atkinson |
| 6,782,374 | B2 | 8/2004 | Nichols |
| 7,020,869 | B2 | 3/2006 | Abrari et al. |
| 7,158,906 | B2 | 1/2007 | Maruno |
| 7,164,422 | B1 | 1/2007 | Wholey, III et al. |
| 7,215,637 | B1 | 5/2007 | Ferguson et al. |
| 7,266,763 | B2 | 9/2007 | Peyton-Jones et al. |
| 7,461,042 | B2 | 12/2008 | Long et al. |
| 7,565,642 | B2 | 7/2009 | Moore et al. |
| 7,571,192 | B2 | 8/2009 | Gupta et al. |
| 7,756,873 | B2 | 7/2010 | Gould et al. |
| 7,849,075 | B2 | 12/2010 | Gould et al. |
| 7,912,842 | B1 | 3/2011 | Bayliss |
| 8,032,501 | B2 | 10/2011 | Bone et al. |
| 8,064,672 | B2 | 11/2011 | Narayanan et al. |
| 8,069,129 | B2 | 11/2011 | Gould et al. |
| 8,073,801 | B1 | 12/2011 | von Halle et al. |
| 8,086,553 | B2 | 12/2011 | Bone et al. |
| 8,122,367 | B2 | 2/2012 | Krieger et al. |
| 8,190,562 | B2 | 5/2012 | Sanghvi et al. |
| 8,301,413 | B2 | 10/2012 | Napolin et al. |
| 8,332,740 | B2 | 12/2012 | Graham |
| 8,347,207 | B2 | 1/2013 | Borgsmidt et al. |
| 8,380,651 | B2 | 2/2013 | Gould et al. |
| 8,386,408 | B2 | 2/2013 | Gould et al. |
| 8,417,678 | B2 | 4/2013 | Bone et al. |
| 8,438,533 | B2 | 5/2013 | Fritsche et al. |
| 8,468,125 | B2 | 6/2013 | Tarnoff et al. |
| 8,478,706 | B2 | 7/2013 | Gould et al. |
| 8,571,317 | B2 | 10/2013 | Welling et al. |
| 8,595,231 | B2 * | 11/2013 | Arends ............ G06F 17/30507 707/723 |
| 8,612,404 | B2 | 12/2013 | Bone et al. |
| 8,645,434 | B2 | 2/2014 | Carter et al. |
| 8,725,660 | B2 | 5/2014 | Forman et al. |
| 8,897,563 | B1 | 11/2014 | Welling et al. |
| 8,898,101 | B2 | 11/2014 | Bone et al. |
| 8,996,442 | B2 | 3/2015 | Gould et al. |
| 9,298,687 | B2 * | 3/2016 | Petrovicky ............ G06F 17/246 |
| 2002/0049777 | A1 | 4/2002 | Terayama et al. |
| 2003/0120593 | A1 | 6/2003 | Bansal et al. |
| 2004/0034848 | A1 | 2/2004 | Moore et al. |
| 2004/0085357 | A1 | 5/2004 | Childress et al. |
| 2004/0088196 | A1 | 5/2004 | Childress et al. |
| 2004/0210661 | A1 | 10/2004 | Thompson |
| 2005/0038764 | A1 | 2/2005 | Minsky et al. |
| 2005/0049924 | A1 | 3/2005 | DeBettencourt et al. |
| 2005/0086360 | A1 | 4/2005 | Mamou et al. |
| 2005/0246686 | A1 | 11/2005 | Seshadri et al. |
| 2006/0089923 | A1 | 4/2006 | Kerisit |
| 2006/0095466 | A1 | 5/2006 | Stevens et al. |
| 2006/0095832 | A1 | 5/2006 | Serra et al. |
| 2006/0106745 | A1 | 5/2006 | Armstrong et al. |
| 2006/0112061 | A1 | 5/2006 | Masurkar |
| 2006/0256014 | A1 | 11/2006 | Sengupta et al. |
| 2006/0294129 | A1 | 12/2006 | Stanfill |
| 2006/0294150 | A1 | 12/2006 | Stanfill et al. |
| 2007/0021995 | A1 | 1/2007 | Toklu et al. |
| 2007/0050340 | A1 | 3/2007 | von Kaenel et al. |
| 2008/0059436 | A1 | 3/2008 | Crocker |
| 2008/0140602 | A1 | 6/2008 | Roth et al. |
| 2008/0256014 | A1 | 10/2008 | Gould et al. |
| 2008/0301155 | A1 | 12/2008 | Borgsmidt |
| 2009/0287617 | A1 * | 11/2009 | Schmidt ................ G06Q 10/06 706/10 |
| 2009/0319832 | A1 | 12/2009 | Zhang |
| 2011/0066602 | A1 | 3/2011 | Studer et al. |
| 2012/0005144 | A1 | 1/2012 | Cutler et al. |
| 2012/0059784 | A1 | 3/2012 | Gould et al. |
| 2012/0066549 | A1 | 3/2012 | Gould et al. |
| 2012/0209800 | A1 * | 8/2012 | Nayak .................... G06Q 10/10 706/47 |
| 2012/0324462 | A1 | 12/2012 | Miljanic |

FOREIGN PATENT DOCUMENTS

| | | |
|---|---|---|
| CN | 101438280 | 5/2009 |
| JP | H01-277939 | 11/1989 |
| JP | H01-296354 | 11/1989 |
| JP | H02-275539 | 11/1990 |
| JP | 04-352029 | 12/1992 |
| JP | H07-334371 | 12/1995 |
| JP | 2000-029899 | 1/2000 |
| JP | 2001-100999 | 4/2001 |
| JP | 2002-157262 | 5/2002 |
| JP | 2003-99855 | 4/2003 |
| JP | 2003-208307 | 7/2003 |
| JP | 2004-227396 | 8/2004 |
| JP | 2005-38253 | 2/2005 |
| JP | 2005-122509 | 5/2005 |
| WO | WO 01/86592 | 11/2001 |
| WO | WO 02/44854 | 6/2002 |

OTHER PUBLICATIONS

"ILog JRules: Leading the Way in Business Rule Management Systems," White Paper. *ILog Business Rules*, Mar. 2005, 15 pages.

Affidavit Pursuant to 37 CFR 1.56 signed by Craig W. Stanfill on Sep. 23, 2009, 2 pages.

Barakat, Nahla and Andrew P.Bradley, "Rule Extraction from Support Vector Machines: Measuring the Explanation Capability Using the Area under the ROC Curve," A.P. Pattern Recognition, pp. 8112-815 (2006).

Chinese Office Action, with English translation, CN Application No. 200980133372.9, dated Dec. 9, 2013, 16 pages.

ILOG JRules Performance Analysis and Capacity Planning, ILOG Business Rules Product Management, Version 1.0, Sep. 2005, 16 pages.

ILOG, "Enrich the Decisioning of Your COBOL Applications," Jun. 2008, pp. 3-8.

International Search Report & Written Opinion in PCT application No. PCT/US09/49299 dated Aug. 12, 2009, 7 pages.

International Search Report & Written Opinion issued in PCT Application No. PCT/US10/22593, dated Mar. 12, 2010, 8 pages.

Japanese Office Action, with English Translation, JP Application No. 2010-503118, dated Aug. 30, 2012, 8 pages.

Japanese Office Action, with English Translation, JP Application No. 2013-155253, dated Jun. 25, 2014, 5 pages.

Liu et al., "A Vector Operation Based Fast Association Rules Mining Algorithm," Bioinformatics, System Biology and Intelligent Computing, pp. 561-564 (2009).

Mukhopadhyay et al., "A Product Recommendation System using Vector Space Model and Association Rule", Rana Information Technology, pp. 279-282 (2008).

Owen, James. "Clash of the Java rule Titans," InfoWorld <http://www.infoworld.com>, Jul. 17, 2006, 4 pages.

PCT International Search Report and Written Opinion dated Jul. 9, 2008. International Application No. PCT/US2008/058360, 14 pages.

Zhang et al., A New Association Rules Mining Algorithm Based on Vector, Genetic and Evolutionary Computing, pp. 429-432 (2009).

(56) References Cited

OTHER PUBLICATIONS

Korel et al., "Data Dependence Based Testability Transformation in Automated Test Generation," Software Reliability Engineering, 2005, ISSRE 2005, 16$^{th}$ IEEE International Symposium on DOI, 10 pages (2005).

Icke, Ilknur and Andrew Rosenberg, "Automated Measures for Interpretable Dimensionality Reduction for Visual Classification: A User Study," Visual Analytics Science and Technology (VAST), pp. 281-282 (2011).

Hamaneh et al., "Automated Removal of EKG Artifact From EEG Data Using Independent Component Analysis and Continuous Wavelet Transformation," IEEE Transactions on Biomedical Engineering, vol. 61, No. 6, pp. 1634-1641 (2014).

Saqib et al., "Automated Optimization of Data-Path Design by Improving Circuit Area and Critical Time through Adaptive Transformation," Intelligent System and Design Applications, pp. 1493-1498 (2010).

U.S. Appl. No. 12/495,316, filed Jun. 30, 2009, Data Logging in Graph-Based Computations.

U.S. Appl. No. 13/958,037, filed Aug. 2, 2013, System for Transform Generation.

U.S. Appl. No. 13/601,416, filed Aug. 31, 2012, Editing and Compiling Business Rules.

Zloof, Moshé M., "Query by Example," IBM, T.J. Watson Research Center, Yorkstown Heights, NY, pp. 431-438 (May 19, 1975-May 22, 1975).

Spenke, Michael and Christian Belken, "A Spreadsheet Interface for Logic Programming," Human Factors in Computing Systems Conference Proceedings, pp. 75-80 (Apr. 30, 1989).

[No Author Listed] Rete algorithm. Wikipedia. Jul. 18, 2012. Retrieved from the Internet on Apr. 18, 2016. 9 pages.

[No Author Listed] Shortest job next. Wikipedia. Oct. 2, 2012. Retrieved from the Internet on Apr. 18, 2016. 2 pages.

De Koninck et al., Join ordering for constraint handling rules. Proceedings of the Fourth Workshop on Constraint Handling Rules. Sep. 8, 2007.

* cited by examiner

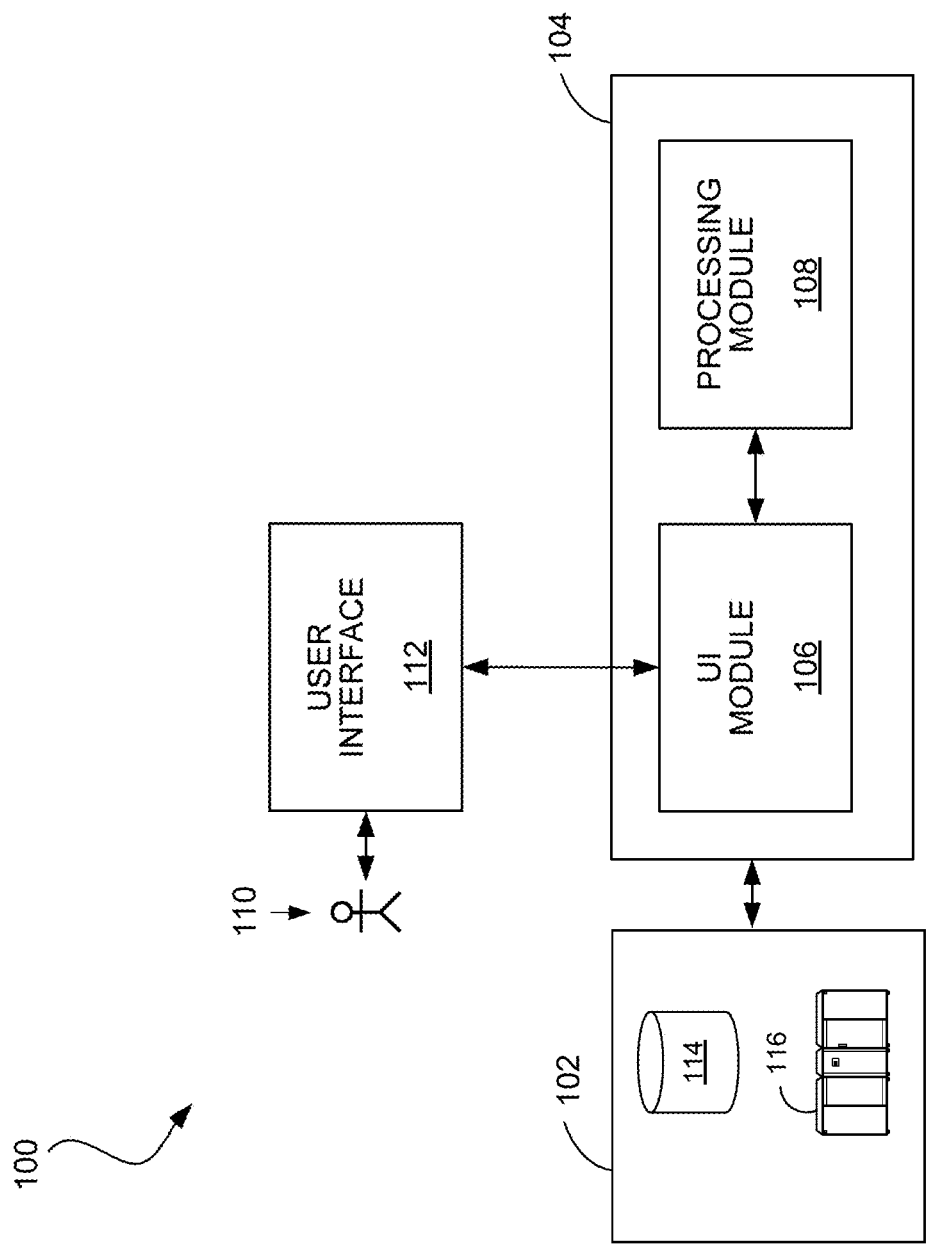

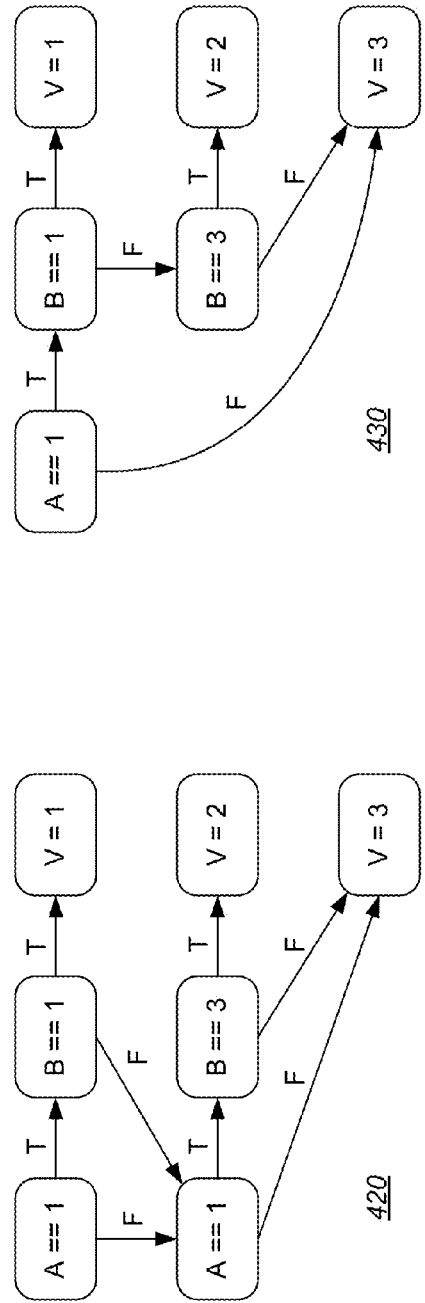

US 9,984,059 B2

EVALUATING RULES APPLIED TO DATA

CROSS-REFERENCE TO RELATED APPLICATIONS

This application claims priority to U.S. Application Ser. No. 61/883,399, filed on Sep. 27, 2013, incorporated herein by reference.

BACKGROUND

This description relates to evaluating rules applied to data.

Rules can be used, for example, for converting data from one format to another, making determinations about data, or generating new data based on a set of input data. Rules for making various decisions (sometimes called "business rules") can determine output data to generate or actions to perform based on input data. A more detailed explanation of business rules can be found in U.S. Pat. No. 8,069,129, EDITING AND COMPILING BUSINESS RULES, which is incorporated herein by reference.

SUMMARY

In one aspect, in general, a computing system specifies one or more rules for processing data included in one or more fields of each element of a plurality of elements of a dataset. The computing system includes a user interface module configured to render a plurality of user interface elements associated with a respective condition. The user interface elements include: one or more first subsets of the user interface elements, at least some subsets of the one or more first subsets associated with an input value derived from at least one field of an element of the plurality of elements of the dataset, and multiple second subsets of the user interface elements, each user interface element of one or more of the multiple second subsets configured to receive user input associated with a respective condition. The computing system includes a processing module configured to apply conditions to at least a first element of the dataset based on user input received from at least some of the user interface elements, in response to receiving user input for a first user interface element associated with a first field. Applying the conditions includes: generating instructions for applying one or more selected conditions associated with fewer than all of the user interface elements, the selected conditions including at least a condition associated with the first user interface element, and executing the generated instructions and providing feedback associated with a result based on applying the condition associated with the first user interface element to data included in the first field of the first element.

Aspects can have one or more of the following features.

The user interface elements are included in cells arranged in a grid having a first axis and a second axis, the one or more first subsets of the user interface elements are included in respective subsets of the cells extending in a direction along the first axis of the grid, and the multiple second subsets of the user interface elements are included in respective subsets of the cells extending in a direction along the second axis of the grid.

The processing module is further configured to: generate a specification of an evaluation order for conditions associated with different cells; and execute the generated instructions for applying the selected conditions according to the specification of the evaluation order, and provide feedback associated with results in response to applying the selected conditions to data included in one or more fields of the first element according to the specification of the evaluation order.

The specification of the evaluation order includes a state transition diagram that includes states representing different conditions and includes transitions among the states that define an order in which the conditions are allowed to be applied.

Applying the conditions further includes: storing the generated instructions; and executing the stored generated instructions to apply the condition associated with the first user interface element to data included in the first field of a second element.

Applying the conditions further includes: storing the result based on applying the condition associated with the first user interface element to data included in the first field of the first element; and retrieving the stored result in response to applying the condition associated with the first user interface element to data included in the first field of a second element that is the same as data included in the first field of the first element.

The one or more subsets of the cells extending in a direction along the first axis are columns of cells.

The multiple subsets of the cells extending in a direction along the second axis are rows of cells.

The result of applying the condition to the data included in the first field of the element includes a pass/fail result.

The providing feedback includes applying shading to the first user interface element if the result is a fail result.

Applying the conditions further includes providing feedback associated with applying conditions associated with one or more cells to data included in multiple elements of the dataset.

The processing module is further configured to validate a syntax of a condition.

The at least some cells associated with a field and a validation rule provide feedback associated with the result of the validation of the syntax of the condition.

The dataset includes one or more tables of a database and the elements of the dataset include database records.

Generating instructions for applying one or more conditions associated with fewer than all of the user interface elements includes generating instructions for applying selected conditions associated with respective user interface elements, the selected consisting of a condition associated with the first user interface element and one or more additional conditions selected based on information specifying potential dependencies between different conditions.

In another aspect, in general, a computing system specifies one or more rules for processing data included in one or more fields of each element of a plurality of elements of a dataset. The computing system includes means for rendering a plurality of user interface elements associated with a respective condition. The user interface elements include: one or more first subsets of the user interface elements, at least some subsets of the one or more first subsets associated with an input value derived from at least one field of an element of the plurality of elements of the dataset, and multiple second subsets of the user interface elements, each user interface element of one or more of the multiple second subsets configured to receive user input associated with a respective condition. The computing system includes means for applying conditions to at least a first element of the dataset based on user input received from at least some of the user interface elements, in response to receiving user input for a first user interface element associated with a first field. Applying the conditions includes: generating instructions for applying one or more selected conditions associated with fewer than all of the user interface elements, the selected conditions including at least a condition associated with the first user interface element, and executing the generated instructions and providing feedback associated with a result based on applying the condition associated with the first user interface element to data included in the first field of the first element.

In another aspect, in general, a method for specifying one or more rules for processing data included in one or more fields of each element of a plurality of elements of a dataset includes: rendering a plurality of user interface elements associated with a respective condition, the user interface elements including one or more first subsets of the user interface elements, at least some subsets of the one or more first subsets associated with an input value derived from at least one field of an element of the plurality of elements of the dataset, and multiple second subsets of the user interface elements, each user interface element of one or more of the multiple second subsets configured to receive user input associated with a respective condition; and applying conditions to at least a first element of the dataset based on user input received from at least some of the user interface elements, in response to receiving user input for a first user interface element associated with a first field, where applying the conditions includes generating instructions for applying one or more selected conditions associated with fewer than all of the user interface elements, the selected conditions including at least a condition associated with the first user interface element, and executing the generated instructions and providing feedback associated with a result based on applying the condition associated with the first user interface element to data included in the first field of the first element.

In another aspect, in general, software stored in a non-transitory form on a computer-readable medium, for specifying one or more rules for processing data included in one or more fields of each element of a plurality of elements of a dataset, the software includes instructions for causing a computing system to: render a plurality of user interface elements associated with a respective condition, the user interface elements including one or more first subsets of the user interface elements, at least some subsets of the one or more first subsets associated with an input value derived from at least one field of an element of the plurality of elements of the dataset, and multiple second subsets of the user interface elements, each user interface element of one or more of the multiple second subsets configured to receive user input associated with a respective condition; and apply conditions to at least a first element of the dataset based on user input received from at least some of the user interface elements, in response to receiving user input for a first user interface element associated with a first field, where applying the conditions includes generating instructions for applying one or more selected conditions associated with fewer than all of the user interface elements, the selected conditions including at least a condition associated with the first user interface element, and executing the generated instructions and providing feedback associated with a result based on applying the condition associated with the first user interface element to data included in the first field of the first element.

In another aspect, in general, a computing system specifies one or more rules for processing data included in one or more fields of each element of a plurality of elements of a dataset. The computing system includes a user interface module configured to render a plurality of user interface elements associated with a respective condition. The user interface elements include: one or more first subsets of the user interface elements, at least some subsets of the one or more first subsets associated with an input value derived from at least one field of an element of the plurality of elements of the dataset, and multiple second subsets of the user interface elements, each user interface element of one or more of the multiple second subsets configured to receive user input associated with a respective condition. The computing system includes a processing module configured to apply conditions to at least a first element of the dataset based on user input received from at least some of the user interface elements, in response to receiving user input for a first user interface element associated with a first field. Applying the conditions includes: generating computer executable instructions for applying selected conditions associated with respective user interface elements, the selected conditions being a condition associated with the first user interface element and one or more additional conditions selected based on information specifying potential dependencies between different conditions, and executing the generated instructions and providing feedback associated with a result based on applying the condition associated with the first user interface element to data included in the first field of the first element of the dataset.

Aspects can include one or more of the following advantages.

In some systems, the process of editing and testing rules can be hindered by the inefficiencies of preparing the edited rules for execution. For example, a rule specification that specifies various conditions that make up a rule may be stored in a format that is suitable for making rule modifications based on user input. But, that rule specification may need to be compiled into an executable form (e.g., computer executable instructions) before the rules can be efficiently applied to input data. Additionally, in order to facilitate the development of rules by users who may be experts in a field for which the rules are being used but not expert computer programmers, it is helpful to provide a relatively short delay between the time a rule specification is edited and the time the specified rule is ready for testing on test input data. A rule compilation procedure that is efficient and responsive to a user's input within a rules editor interface enables certain technical problems hindering such rule development to be overcome.

The system described herein is able to efficiently compile instructions for applying a rule in response to receiving user input. For example, the user input may be associated with editing a portion of a rule specification. The system is able to selectively re-compile instructions for portions of the rule specification without having to re-compile instructions for the entire rule specification. This selectivity enables efficient feedback for rule editing. For example, a rule may be specified using various conditions expressed by different logical expressions. When a user enters an expression, compiled instructions for evaluating that expression can be generated and saved. Results of applying those expressions to input data can be displayed within an editor. Some of the expressions may depend on results of other expressions. Results of applying expressions to input data (including results of other expressions), or results of evaluating expressions that do not depend on input data, can also be saved. The entire rule specification can be evaluated again after a user edits a particular expression by re-compiling that expression and selectively re-executing saved instructions for expressions whose input values may have been affected by the user edit. A lineage representation of an order in which expressions are evaluated can be used to determine those expressions that are potentially dependent on the edited expression. If an expression is determined to be not affected by an edit, then its saved results can be used without having to re-compile or re-evaluate that expression.

Other features and advantages of the invention will become apparent from the following description, and from the claims.

DESCRIPTION OF DRAWINGS

FIG. 1 is a block diagram of a system for evaluating rules applied to data.

FIG. 4B is a user interface for a rule of the lineage diagram.

FIGS. 4C and 4D are state transition diagrams for the rule of FIG. 4B.

DESCRIPTION

Figure 2A:
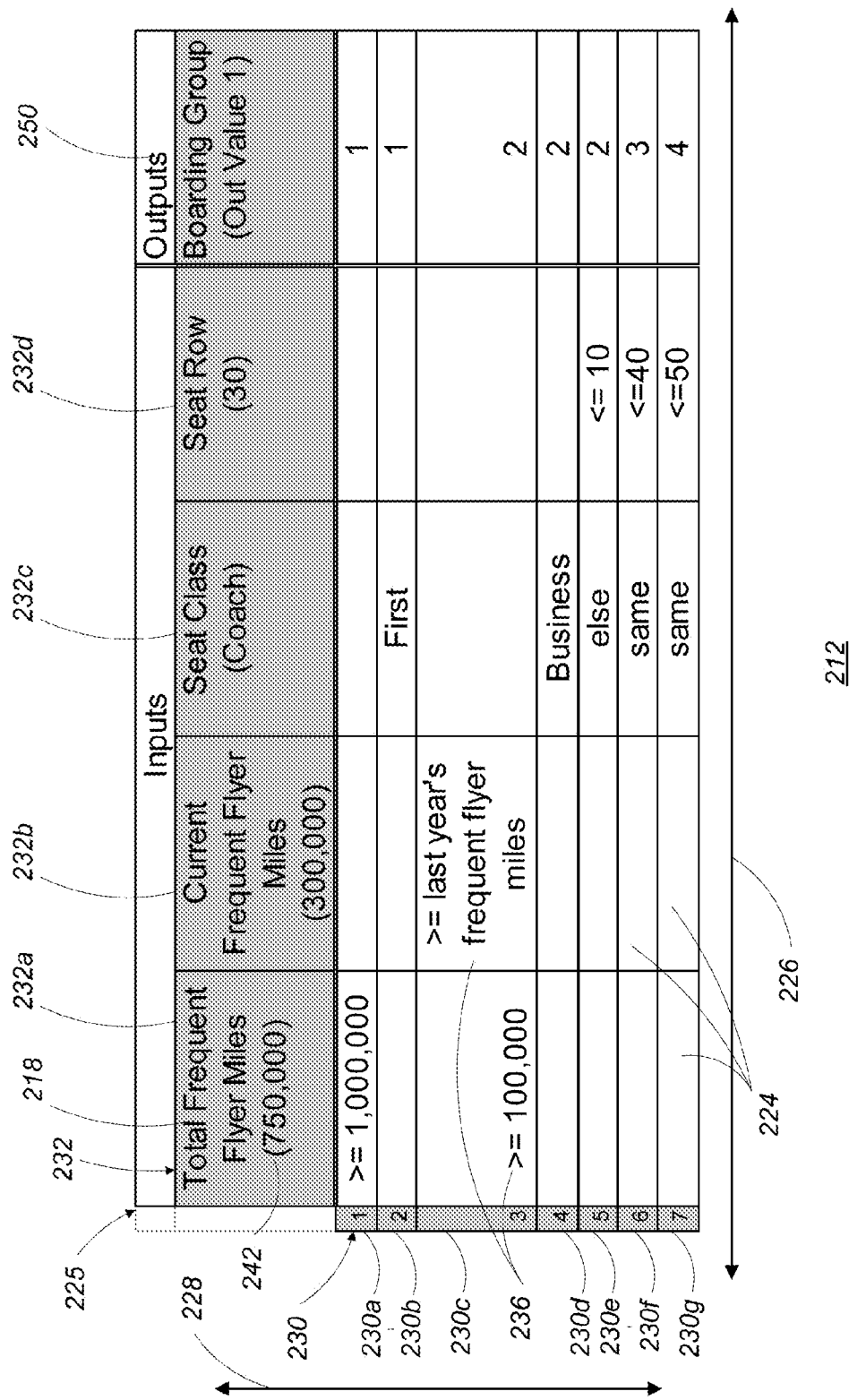
FIG. 2A is a user interface for specifying rules for analyzing data.

FIG. 1 shows an exemplary data processing system 100 in which the rule evaluation techniques can be used. The system 100 includes a data source 102 that may include one or more sources of data such as storage devices or connections to online data streams, each of which may store data (sometimes referred to as a "dataset") in any of a variety of storage formats (e.g., database tables, spreadsheet files, flat text files, or a native format used by a mainframe). An execution environment 104 includes a user interface (UI) module 106 and a processing module 108. The UI module 106 manages input received from a user 110 over a user interface 112 (e.g., a graphical view on a display screen) for specifying rules to be used by the processing module 108 for processing data from the data source 102.

The execution environment 104 may be hosted on one or more general-purpose computers under the control of a suitable operating system, such as the UNIX operating system. For example, the execution environment 104 can include a multiple-node parallel computing environment including a configuration of computer systems using multiple central processing units (CPUs), either local (e.g., multiprocessor systems such as SMP computers), or locally distributed (e.g., multiple processors coupled as clusters or MPPs), or remote, or remotely distributed (e.g., multiple processors coupled via a local area network (LAN) and/or wide-area network (WAN)), or any combination thereof.

The processing module 108 reads data from the data source 102 and evaluates rules applied to the data based on a rule specification defined by input obtained by the UI module 106. In preparation for evaluating a rule, the processing module 108 generates an evaluation order that defines at least a partial ordering among multiple rule conditions of the rule specification, as described in more detail below. The evaluation order can be represented, for example, as a state transition diagram that determines an order in which different rule conditions will be evaluated. Storage devices providing the data source 102 may be local to the execution environment 104, for example, being stored on a storage medium connected to a computer running the execution environment 104 (e.g., hard drive 114), or may be remote to the execution environment 104, for example, being hosted on a remote system (e.g., mainframe 116) in communication with a computer running the execution environment 104, over a remote connection.

In general, a dataset accessed from the data source 102 includes a number of data elements (e.g., records formatted according to a predetermined record structure, or rows in a database table). Each element of the number of data elements can include values for a number of fields (e.g., attributes defined within a record structure, or columns in a database table) (e.g., "first name," "last name," "email address," etc.), possibly including null or empty values. Various characteristics of values in the fields (e.g., related to content or data type), or the presence or absence of values in certain fields, may be considered valid or invalid. For example, a "last name" field including the string "Smith" may be considered valid, while a "last name" field that is blank may be considered invalid.

Some rules can be applied to test for valid values or other characteristics of the data values. The performance of an application that utilizes a dataset from the data source 102 may be adversely affected if the dataset includes a significant number of data elements with one or more invalid fields. The processing module 108 may apply data validation rules to the dataset, to ensure that the dataset meets a quality constraint defined by validation rules. The data processing system 100 alerts a system administrator if the quality of the dataset fails to meet the quality constraint. In some examples, the processing module 108 may be configured to repair invalid data, if possible, or perform various data cleansing procedures to generate a dataset of cleansed data elements. In yet other examples, the processing module 108 may be configured to generate a list of fields that include invalid data from which reports can be generated. In some examples, the reports include a count of records that included invalid data for one or more of the fields in the list of fields. In other examples, aggregations of invalid fields are calculated from the list of fields.

In general, different applications process different types of data. Thus, depending on the application, the elements of the dataset may include different fields. The UI module 106 provides the user interface 112, which enables a set of rules to be specified and used to process the dataset. The user interface 112 is able to provide a single view including multiple fields of a particular data element structure (in some implementations, all the available fields). Thus, for a given application, the user 110 (e.g., a system administrator) is able to specify appropriate validation rules for the data.

In some systems, rules are applied to data to validate data according to certain standards of data quality. Many modern applications, including business applications, process large sets of data (i.e., "datasets"), which may be compiled from various sources. The various sources that provide data to the dataset may have different levels of data quality. To ensure that the applications function properly, an adequate level of data quality in the dataset should be maintained. To maintain an adequate level of data quality, the dataset can be processed by a data validation system. Such a system applies validation rules to the dataset before it is provided to the application. In some examples, the data validation system uses the results of validation rules to calculate a measure of data quality and alert an administrator of the application if the measure of data quality falls below a predetermined threshold. In other examples, the data validation system includes modules for handling data that fails one or more of the validation rules. For example, the data validation system may discard or repair data that fails one or more of the validation rules. In general, the validation rules applied by the data validation system are defined by an administrator of the data validation system.

In some systems, rules are applied to data to make decisions (e.g., business decisions) based on the content of the data. For example, a record in a flight reservation system may indicate the name of a passenger, how many miles the passenger has flown this year, the class of their ticket, and the row they are seated in. A business rule can be configured to indicate that such a passenger should be put in boarding group 1. A business rule is generally easy for a human to understand, i.e., "first class passengers are in group 1," but may need to be translated into something a computer can understand before it can be used to manipulate data.

An interface for editing validation rules or business rules or other rules may incorporate features to efficiently generate instructions for applying a rule, enabling efficient feedback for rule editing. To simplify creation of rules for non-technical users, an interface is provided for such users to specify a set of rules, referred to as a rule set, in a format with which they are familiar. A rule set is the set of rules that are to be applied to a dataset (e.g., the validation rules defined based on user input in a user interface). A rule within a rule set may be composed of one or more rule cases that compute different values for the rule's output depending on the input. A rule may also reference other rules, for example, by referencing values computed by other rules.

Referring to FIG. 2A, one example of the user interface is a rule grid 212 configured to facilitate the user 110 specifying one or more rules for processing the data included in one or more fields of each element of the dataset.

The UI module 106 renders the user interface 212 (e.g., on a computer monitor) using a number of cells 224 arranged in a two-dimensional grid 225 having a first axis 226 and a second axis 228. In this example, each cell of the user interface 212 is configured to receive input, such as text, entered by a user (e.g., using a text input field, or other type of user interface element). One or more subsets of the cells (referred to as columns or trigger columns 232 in the remainder of the detailed description) extends in a direction along the second axis 228 of the two-dimensional grid 225. Each of the trigger columns 232 can optionally be associated with an input value derived from data in a data element such as a value from a field of a data element of the dataset, or derived from other sources. For example, the input value associated with a trigger column can also reference values computed by other rules (e.g., intermediate values and/or output values), or values from another data source or from user input, or any combination of these. In some examples, the first (i.e., the topmost) cell of each of the columns 232 includes the name of a field 218 or other source of an input value 242 associated with the trigger column 232. The user interface 212 is also configured to display the input value 242 associated with the trigger column 232 for the element currently selected in the user interface 212.

Multiple subsets 230 of the cells 224 (referred to as rows or rule case rows 230 in the remainder of the detailed description) extend in a direction along the first axis 226 of the two dimensional grid 225. One or more of the rule case rows 230 is associated with a respective set of conditions that relate to the available input values associated with the trigger columns 232. It is noted that in some examples, the directions of the first axis 226 and the second axis 228 can be swapped, causing the columns 232 associated with the input values to become rows 230, and the rows 230 associated with the rule condition 236 to become columns 232. Alternatively, other groupings of the subsets of cells (or other user interface elements) corresponding to a rule case may not use a grid arrangement, and may instead use different screen regions (e.g., windows) that are arranged or selectively presented in responds to user navigation, for example.

To apply a rule to one or more data elements, the processing module 108 is able to generate a state transition diagram (or other representation of the evaluation order) for the rule based on the arrangement of the rows and columns within the grid, as described in more detail below. The processing module 108 uses the state transition diagram to successively evaluate rule conditions of the rule case rows until a rule case is satisfied. A rule case specified in a given rule case row 230 is satisfied for a given data element if the input values 242 derived from that data element, for each trigger column 232 in which the rule case has a condition, meet the triggering conditions (i.e., a rule case that has all of its conditions on input values satisfied may be referred to as "triggered"). If a rule case 230 is triggered, output is generated based on one or more output columns 250. In some implementations, the evaluation of rule case rows stops after the first rule case has triggered. Each output column 250 may correspond to a potential output variable, and the output column value in the corresponding cell of the applicable row 230 determines the output, if any, for that variable. The cell could contain a value that is assigned to the variable or it could contain an expression that must be evaluated to generate the output value, as discussed below. There may be more than one output column, though only one is shown in FIG. 2A.

While the resemblance of a grid of rule case rows to a spreadsheet may aid in a user's ability to visualize a rule, the implicit dependencies among cells based on their arrangement within the grid is different from the explicit dependencies between cells in a spreadsheet and the other cells that they reference. For example, in some implementations, whether the rule conditions of a rule case row are even evaluated depends on whether a rule case above that rule row has already been triggered.

There may be several different types of trigger columns 232 with cells that correspond to different kinds of conditions. Some trigger columns (e.g., "comparison columns") can include cells that define a value or range of values that are compared to the input value associated with that trigger column, and the result of the comparison evaluates to true or false. Some trigger columns (e.g., "free-form columns") are not associated with an input value, and instead include cells that define a condition that evaluates to true or false without requiring comparison to an input value. Thus, each non-empty cell defines (explicitly or implicitly) a condition that evaluates to true or false, whether the condition is dependent on a data element or not. Free-form trigger columns can include cells that contain, for example, one of the following:

An expression. The condition will be considered to be true if the evaluation of the expression evaluates to a non-zero, non-NULL value.
  The keyword "any," or an empty string. The condition is always true. Each empty cell in a trigger column is equivalent to one explicitly containing the keyword "any."
  The keyword "else." The condition is true if none of the cells above the cell containing "else" and below any empty cells are true, in rows where all cells to the left are identical.

The keyword "same". The condition is true if the cell above is true.

Comparison columns can include two types of cells. One type of cell is an expression cell. Those cells behave exactly like cells in a free-form column, described above. However, the keyword "this" can be used in the expression to refer to the column input value. The other type of cell is a comparison cell that defines a value or range of values to be compared to the input value associated with the column. An exemplary grammar for comparison cells is as follows:

```
operator ::= ">" | "<" | ">=" | "<=" | "!=" | "=" | "equals"
value_element ::= constant | constant | variable | "("expression ")"
value_expression ::= [ operator ] value_element
simple_function ::= "is_null" | "is_blank" | "is_valid" |
   "is_defined" | "is_bzero"
membership_expr ::= "in" "[" value_element ( ( "," | "to" | "or" )
   value_element)* "]"
simple_value ::= [ "not" ] ( value_expression | simple_function |
   membership_expr )
compound_value ::= simple_value ( "and" simple_value )*
comparison_value ::= compound_value ( "or" compound_value )*
``` where a "*" means a term is repeated zero or more times. If no operator is specified in a cell, a default operator such as "equals" can be implied.

Any suitable programming language or syntax may be used. Examples may include C, Java, Prolog. In some implementations, the programming language can be a data manipulation language (DML) that also includes syntax for defining data formats and manipulating data using various data processing operations.

To evaluate a comparison cell for a given trigger column, the value 242 associated with the column 232 is compared against the comparison cell value or range according to the operator, function, or membership expression. In the example of FIG. 2A, the first two trigger columns 232a, 232b contain comparison cells with the ">=" operator, thus the condition is met if the value for that column is greater than or equal to the corresponding number. If there is no operator, as in the 'Seat Class' column 232c, then "equals" is assumed. A constant can be any legal constant in whatever programming language or syntax is used in the underlying system. The other constants and variable are business terms as defined within the rule set, as described below. An expression is any legal expression in the language being used that returns a compatible data type that will be compared against the column input value. In some examples, expressions inside comparison cells are enclosed in parenthesis to avoid ambiguity. For the simple_function, the function is applied to the column input value, so the "is_null" keyword is the same as the expression "is_null (this)".

In the example of FIG. 2A, the first row 230a has a condition in only one column (i.e., 'Total Frequent Flyer Miles' column 232a), which indicates that if the total number of frequent flyer miles for a traveler is greater than 1,000,000, then that rule case applies regardless of what value any other columns may have. In that case, the "Boarding Group" output variable for that user is set to group 1. Likewise, the second rule case 230b indicates that any flier in first class is in group 1. In some examples, the rules are evaluated in order, so a traveler having over 1,000,000 miles and a first class ticket will be in group 1, but only the first rule case will be triggered. Once a rule case is triggered, the other rule cases in that rule do not need to be evaluated.

The third rule case 230c is based on two input values (i.e., values associated with the 'Total Frequent Flyer Miles' and 'Current Frequent Flyer Miles' columns 232a, 232b)—if the conditions defined for both total frequent flier miles and current-year miles are met, then the flier is in group 2. In the fourth rule case 230d, any business class customers are also in group 2. The remaining rule cases 230e-230g contain conditions that relate to the other rule cases, i.e., "else" and "same." As discussed above, the keyword "else" indicates that none of the conditions in that trigger column were met in rows that were above that one and below any empty cells and which had the same condition to the left, which in this example means the seat class is not "Business." The keyword "same" indicates that the rule case applies if the rule case above it applied with respect to that trigger column. Thus, each of the remaining rule cases 230e-230g applies to data elements that didn't match any higher rule case, and which have the appropriate "seat row" value.

In some examples, the rule cases 230 a-g in the example of FIG. 2A can also be represented as individual simple rules, each in their own grid (not shown). A user could create these individual rules separately, rather than generating the entire table shown in FIG. 2A.

In some examples, the editor interface shown in FIG. 2A may graphically identify cells that contain expressions, and may graphically distinguish between an expression that will be evaluated to true or false on its own and an expression that returns a value that is compared against the column input value. When the user 110 is typing, they can indicate that a particular cell is to be an expression cell by, for example, typing an asterisk at the beginning.

In some examples, values and expressions are DML expressions. The special keywords and the business names for fields and values are encoded as strings that are pre-processed out of the DML expressions. Note that the expressions can use the logical (business) names for variables, but can also refer to the actual physical names.

For columns that correspond to output variables, the cells can contain, for example, one of the following:
A value. The value that will be assigned to the output variable
An expression. The value of the expression is assigned to the output variable. If the expression evaluates to NULL then the field gets the NULL value, unless the output field is not-nullable. In which case, an error is generated.
The keyword "null". If the output field is nullable, then the field will be assigned NULL. Otherwise, an error is generated.
An empty string. If the output field has a default value, then the default value is assigned. Otherwise, the cell is treated as if it contains the keyword "null".
The keyword "same". The output field is assigned the same value computed in the cell above.

If possible, errors are reported as soon as possible (e.g., putting "null" in an output for a non-nullable field). However, some errors are not reported until either test-time or run-time.

In addition to expressions, users may be allowed to attach comments to any cell in the rule. The comments can be displayed like comments attached to cells in spreadsheet programs such as Microsoft Excel.

In some examples, the rules editor interface may be configured to restrict what a user may enter more tightly than the technical requirements of the interface would require. For example, the interface may be configured to only allow certain types of input values or certain types of expressions in order to provide a simpler, more constrained user interface. The interface may also be configured to restrict which cells in a rule can be changed, based on a user's role or user ID. Such restrictions may be applied to a rule set by an administrator.

Rules can be defined based on a rule grid in various ways when the processing module 108 evaluates a rule. In some examples, rules may be evaluated in a manner converse to that described above, with rule cases in rows being ANDed and columns being ORed. That is, a rule produces an output only if every row triggers (ANDing the rows) but only a single cell needs to be true for each row to trigger (ORing the columns).

A more detailed explanation of the rules grid can be found in U.S. Pat. No. 8,069,129, EDITING AND COMPILING BUSINESS RULES, which is incorporated herein by reference.

Figure 2B:
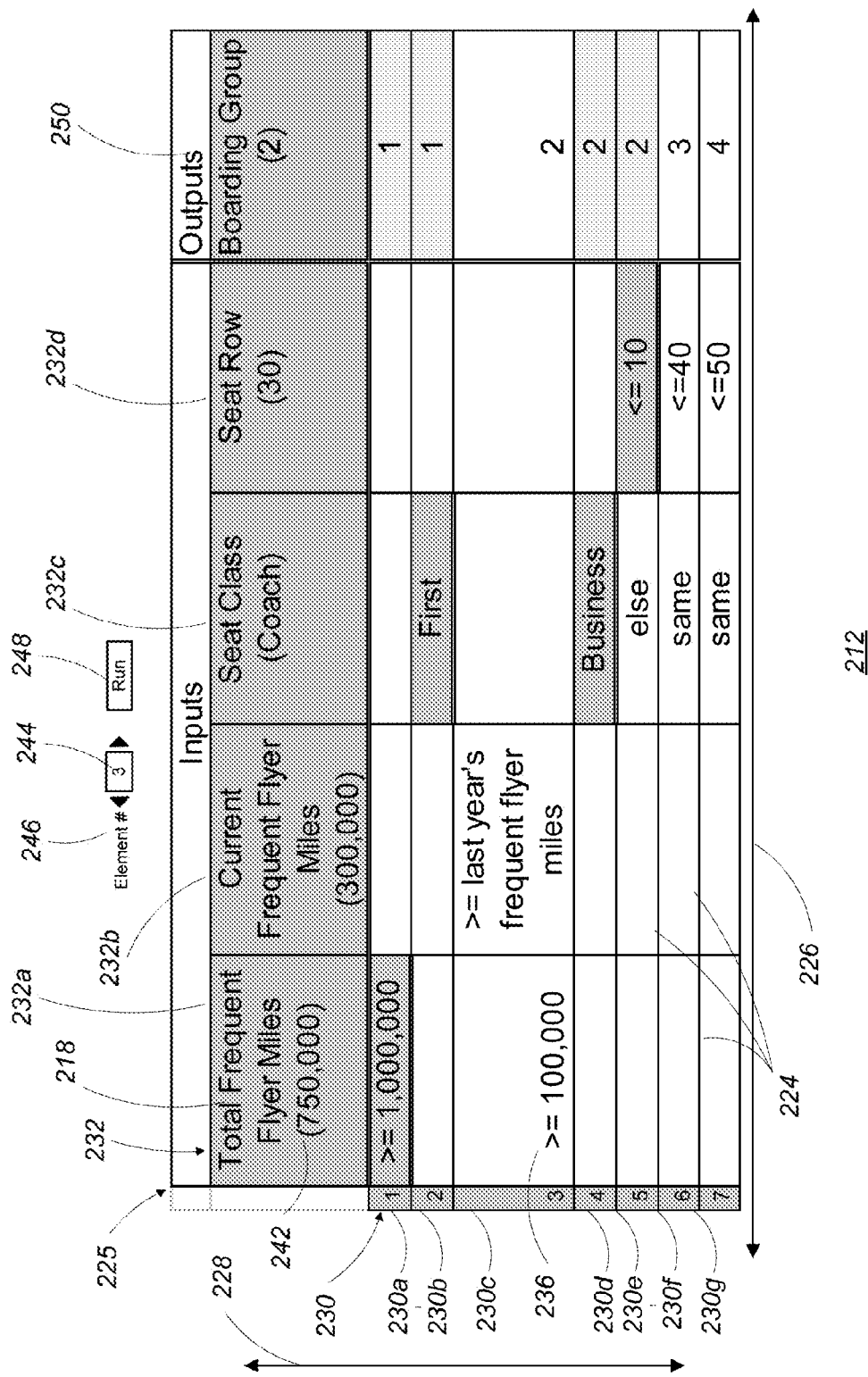
FIG. 2B is a user interface for specifying rules for analyzing data including user feedback.

Referring to FIG. 2B, the user interface 212 of FIG. 2A can be augmented to provide feedback to the user 110. In particular, each of the cells of the two-dimensional grid 225 is configured to indicate whether the rule condition 236 for the cell passed or failed for an element 244 currently selected by the user interface 112. In some examples, the pass/fail indication is provided to the user 110 by shading cells that failed their associated rule condition 236. For example, the cell associated with the first rule case 230*a* and the first trigger column 232*a* includes a rule condition that returns a pass result if the value 242 of the field 218 associated with the first trigger column 232*a* (i.e., the 'Total Frequent Flyer Miles' trigger column) is greater than or equal to 1,000,000. From inspection, one can see that the actual value 242 of the field 218 associated with the first trigger column 232*a* is 750,000 which is less than 1,000,000. Thus, the rule condition 236 fails and the cell associated with the first rule case 230*a* and the first trigger column 232*a* is shaded to indicate the failed result. Various other cells are shaded in the figure, indicating that they include failed rule conditions. Output cells in the output column 250 are shaded if that rule case row has at least one failed rule condition. Thus, the first non-shaded output cell would correspond to the rule case that is triggered. The user 110 can utilize the feedback to ensure that the specified rules are functioning as expected.

In some examples, the user 110 can navigate through the elements of the dataset using a navigation control 246. In some examples, navigation control 246 includes arrows, which allow the user 110 to step through the elements of the dataset one at a time and a numeric field, which allows the user 110 to enter a dataset element number that they would like to view. Whenever the user 110 navigates to a different element using the navigation control 246, the processing module 108 executes the specified rule cases on the values of the newly selected element.

In some examples, the user interface includes a test control 248, which permits the processing module 108 to apply the specified rule cases to all of the elements of the dataset. Upon completion of applying the rule cases to the dataset, the processing module 108 provides the results of applying the rule cases to the dataset to the UI module 106, which in turn displays the results in the user interface 212 to the user 110. For example, the number of elements for which a rule case triggered can be displayed in the user interface 212. The results can be compared against previously stored baseline results generated, for example, from a different version of the same rule cases or a different set of rule cases or rules applied by a different system. A set of filtered data elements can also be presented along with the results applying the rule cases to all of the data elements of the dataset. For example, the filter may display only those elements for which there is some difference in results compared to the baseline results, or the filter may display only those elements for which a particular expression is true (or false) or for which a particular rule or rule case was triggered (or not triggered). In some examples, a summary of the results are displayed to the user in a separate user interface (not shown).

In some examples, the feedback described above can be provided as a rule is being edited within the user interface 212. The UI module 106 provides information entered into the cells of the user interface 212 to the processing module 108 to apply the edited rule condition within a rule case row to the corresponding value 242 of the trigger column 232. The processing module 108 uses the techniques described herein to selectively determine which other rule conditions should be applied to the respective values of their trigger columns.

In some examples, when a rule case is added, removed, or any of its cells are modified by the user 110 through the user interface 212, the UI module 106 passes the changes to the processing module 108, which re-applies the changed rule conditions, and any other rule conditions that come after those rule conditions in an evaluation order, as described in more detail below. If a rule case is added or any of its cells are modified, the processing module 108 is configured to apply the newly added or modified rule case to at least one element of the dataset. In some examples, the added or modified rule case is applied only to the element of the dataset that is current displayed in the user interface 212. The result of applying the added or modified rule case and any other selected rule cases are then passed to the UI module 106, which in turn updates the user interface 212 to display the results. For example, if the newly added or modified rule case includes a condition 236 that produced a failed result for the element of the dataset, the cell including the condition 236 is shaded to indicate the failed result. Conversely, if the newly added or modified rule case includes a condition 236 that produced a passing result for the element of the dataset, the cell including the condition 236 is not shaded, indicating a passing result.

Due to potential dependencies between the rule conditions, changing one rule condition may affect the results of other rule conditions that may depend on the result of the changed rule condition since they are evaluated after that rule condition. Thus, in some examples, the processing module 108 is configured to re-apply all rule conditions that are ordered after a newly added, removed, or modified rule condition in a determined evaluation order. The results of re-applying those selected rule conditions are also displayed to the user on the user interface 212.

Figure 2C:
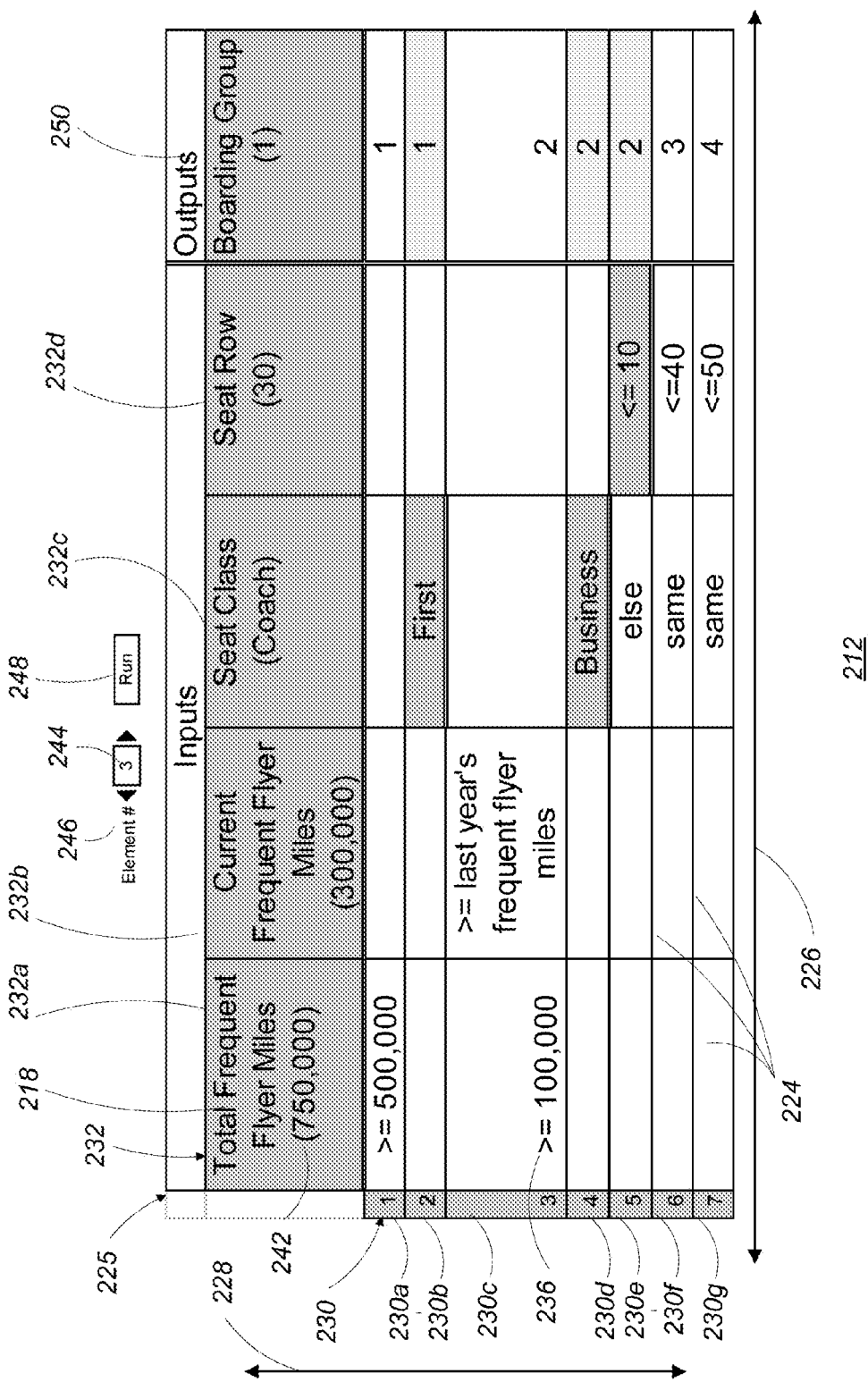
FIG. 2C illustrates the user interface of FIG. 2B with a modified rule case.

Referring to FIG. 2C, the user 110 has modified the cell associated with the first rule case 230*a* and the first trigger column 232*a* through the user interface 212 of FIG. 2B. In particular, the cell is changed to indicate that the rule condition associated with the cell is satisfied if the value of the 'Total Frequent Flyer Miles' is greater than or equal to 500,000 rather than the previous value of 1,000,000.

Modifying the first rule case 230*a* causes the processing module 108 to re-apply the rule case for the currently selected element. Since the value of the 'Total Frequent Flyer Miles' field for the currently selected element is 750,000, a passing result for the modified cell of the first rule case 230*a* is returned by the processing module 108 and displayed as an un-shaded cell by the user interface 212. Since the first rule case passed the 'Boarding Group' output value changes to 1. In this example, none of the other rule cases have conditions that need to be re-applied.

In the following example, the processing module 108 will selectively determine which rule cases are to be re-applied for efficient re-evaluation of the rule cases after a user edits a cell. The processing module 108 generates (e.g., compiles) executable instructions for applying each rule condition as a function of any input values on which the condition depends, such as the value 242 associated with a trigger column, or values associated with other cells. The executable instructions, the input values, and the results of applying those executable instructions to those input values can be stored for later use, along with information specifying potential dependencies between different rule conditions based on an order of evaluation for those rule conditions.

Figure 3:
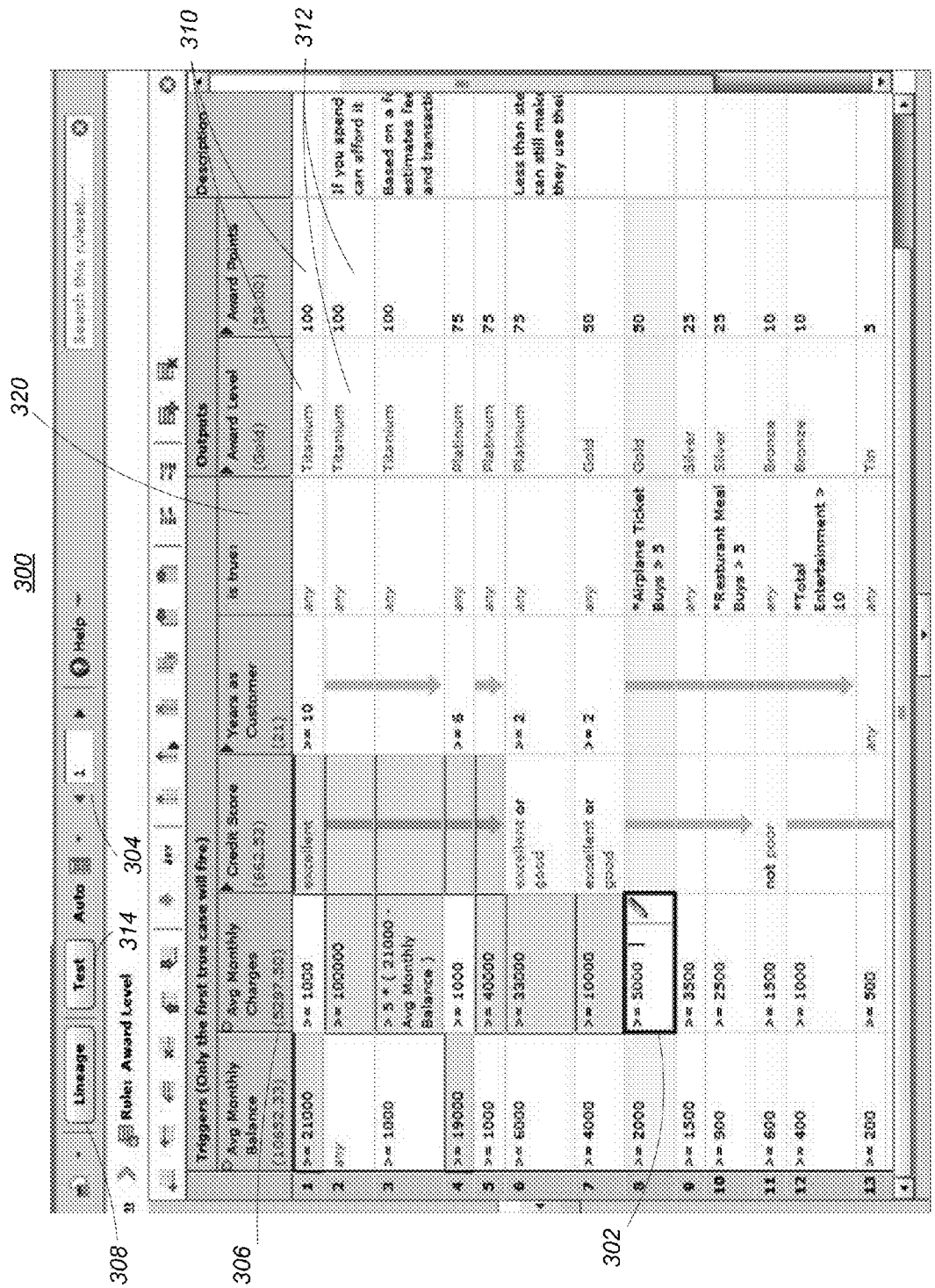
FIG. 3 is a screen capture of the user interface for specifying rules.

Referring to FIG. 3, a screen capture 300 illustrates one implementation of the user interface 212 of FIGS. 2A-2C. The user interface implemented in the screen capture 300 is configured to allow a user 110 to specify rules for a dataset while receiving feedback from application of those rules to that dataset (or a different test dataset).

As is described above for the user interface 212, the user interface illustrated in the screen capture 300 includes a two-dimensional grid of cells. The grid includes a number of rows, each row associated with a rule case. The grid also includes a number of trigger columns. The name of each input value is included at the top of each of the columns (e.g., "Avg Monthly Balance," Avg Monthly Charges," etc.). This example includes a custom trigger column 320, where each cell is not limited to providing a rule condition for a common input value, but rather for any computed value (such as "Airplane Ticket Buys" for rule case row 8, or "Restaurant Meal Buys" for rule case row 9).

In this example, the user 110 has specified a number of rule case conditions, each associated with a respective rule case and a trigger column. To do so, the user 110 selects a cell and enters an expression into the selected cell. For example, in the figure, the user 110 has selected a cell 302 at the intersection of the row associated with the $8^{th}$ rule case and the column associated with the "Avg Monthly Charges" field and has entered the expression ">=5000." The expression entered into the selected cell indicates that the rule case only passes for a given data element if the value of the "Avg Monthly Charges" field for the data element is greater than or equal to 5000. The current value of the "Avg Monthly Charges" field for the data element currently selected in the navigation control 304 is displayed in the trigger column heading 306. If the number of the selected data element is changed (e.g., from "1" to "2"), the processing module 108 does not necessarily need to re-compile and re-evaluate all of the rule conditions from all of the cells. For example, for cells that have not been edited when the next data element is selected, the stored compiled instructions for the rule conditions in those cells can be retrieved and re-executed on new input values for the next data element. Furthermore, if an input value for a particular trigger column for the next data element is the same as the input value for that particular trigger column for the previous data element (e.g., "Years as Customer" has the same value "21"), then the stored results for the rule conditions in those cells can be retrieved and re-used without even needing to re-execute the compiled instructions.

Feedback can be provided within the user interface, as the user edits the cells, about whether or not particular cells' conditions are satisfied. Different colors can indicate different results. One color can be used to indicate that a cell's condition is not satisfied, and another color can be used for an entire rule case row for which all of the cells' conditions are satisfied (as they are for the $8^{th}$ rule case in FIG. 3), in which case that rule case will be triggered when the rule is run on the selected data element.

Figure 4A:
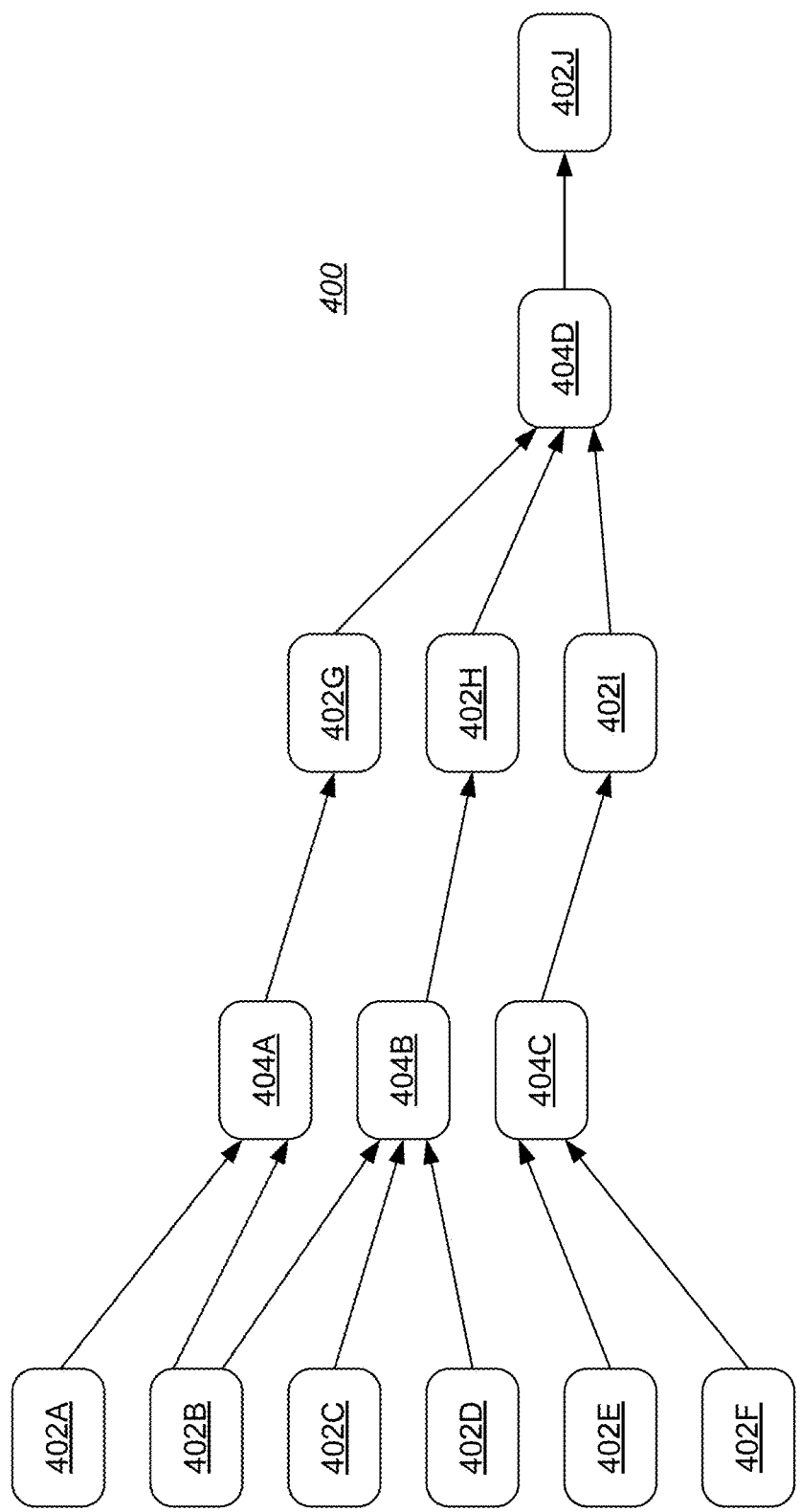
FIG. 4A is a lineage diagram for efficiently compiling and applying rules.

Referring to FIGS. 4A-4C, after an expression is entered into a selected cell of a rule being edited, in response to the user 110 completing the editing (e.g., by de-selecting the cell or navigating to another cell) the processing module 108 selectively re-applies rule conditions based on a specification of potential dependencies between different rule conditions associated with different cells of the edited rule or other rules in the same rule set as the edited rule, as represented, for example, by a lineage diagram 400 (FIG. 4A) and a state transition diagram 430 (FIG. 4D). The nodes 402A-402J in the lineage diagram 400A represent values (field values or other input values, output variables, and/or other variables storing values used in the computation), and the nodes 404A-404D represent rules that each includes any number of rule cases. Together the rules represented by the nodes 404A-404D may correspond to an entire rule set, for example. The node 404B in the diagram 400 represents the rule with the edited rule condition. The lineage diagram 400 and state transition diagram 430 represent an order in which rules and rule conditions, respectively, are evaluated. Thus, the potential dependencies specified by this type of specification of an evaluation order are due to the potential for later-evaluated items to be dependent upon results of earlier evaluated items. These dependencies are thus potential dependencies in the sense that it is possible that a later-evaluated ("downstream") item is not affected by an earlier-evaluated ("upstream") item.

FIG. 4B shows a simplified example of such a rule 410. The rule 410 includes three rule case rows for rule conditions on input values A and B of two trigger columns, and an output variable V of a single output column. A state transition diagram 420 representing an order in which the different rule conditions may be evaluated is shown in FIG. 4C. Each state corresponds to evaluation of a particular rule condition for a particular cell of the rule 410. The transitions correspond to a result of the evaluation being either true (T) or false (F). Such a state transition diagram 420 can be generated, for example by providing a chain of states connected by T links for the cells in each row, with F links from each state in the chain going to the first state in the chain of states for the next row. This technique for generating a state transition diagram corresponds to an evaluation order that depends on the order of trigger columns. Improvements in the efficiency of rule evaluation represented by the state transition diagram can be made by changing the order of trigger columns, or even by removing certain redundant states. For example, FIG. 4D shows a state transition diagram 430 that removes a state representing a rule condition that does not need to be evaluated since it has already been evaluated previously in the same diagram 430. The links to and from the removed state can also be removed, with links of other states being modified to provide the same functionality. Even with the modifications to improve efficiency, the state transition diagram may not represent the optimum order of evaluation. However, even if the state transition diagram is sub-optimal, the techniques described herein of selectively re-evaluating rule conditions during editing can still result in efficient updating of the rules editor interface.

When only a single cell's rule condition has changed, the processing module 108 only has to re-compile the edited cell's rule condition to generate executable instructions for applying the rule condition. The processing module 108 executes those re-compiled instructions and also executes previously stored compiled instructions for applying rule conditions that occur later in the evaluation order than the rule condition associated with the edited cell. So selected rule conditions "downstream" of the edited rule condition may be re-evaluated, but not rule conditions "upstream" of the edited rule condition. In this example, if the rule condition that determines whether or not the value of the input B is equal to 2 (corresponding to the state labeled "B=2" in the state transition diagram 420) was just edited, the processing module 108 will re-compile the instructions for that state and then will continue execution from that state, executing downstream rule conditions as needed, depending on the results of each rule condition. The processing module 108 will also selectively re-evaluate values and rule conditions of other rules based on their relationship to the edited rule 404B in the evaluation order, i.e., according to the lineage diagram 400. So, in this example, the values 402H and 402J, and the rule conditions of rule 404D, which are all downstream of the edited rule 404B will be re-evaluated, and the other values and rules do not need to be re-evaluated since they are not downstream of (i.e., later in the evaluation order) the edited rule 404B.

Feedback can then be provided in response to selectively applying those downstream rule conditions to input data according to the evaluation order as represented by the lineage diagram 400 and the state transition diagram 430. The results of the execution are passed back to the UI module 106 for display in the user interface. Feedback to the user is provided to the user 110 by shading any cells that include a failed rule condition and not shading cells that include a passing rule condition. The implementation of the user interface illustrated by the screen capture 300 includes a number of shaded cells (which were shaded after re-application of the rule conditions), which indicate that the rule condition specified in that shaded cell has failed for the currently selected data element. The user interface also includes a control 308 to initiate generation of a lineage diagram, showing the relationships between the rule being edited and input and output values and other rules, to be presented in a user interface window.

In some implementations, the processing module 108 selectively re-compiles rule conditions more often than is strictly necessary based on a trade-off between resources needed to manage the executable instructions for different cells and resources needed to perform the re-compilation. In some situations (e.g., for a simple set of rules with relatively few cells), rule conditions even for cells that have not been edited may be re-compiled. Furthermore, the processing module 108 may not need to store dependency information tracking dependencies between different sets of complied instructions (generated after the initial compilation or after re-compilation) for those situations in which editing cells will always result in re-compilation of all cells.

In general, when the set of rules specified in the user interface is applied to a data element, the first rule case (i.e., the rule case specified in the first row of rule cases) is evaluated against the values of the fields of the data element. If all of the conditions of the first rule case are satisfied, then the output of the rule set is a set of outputs 310 associated with the first rule case. If any of the conditions of the first rule case are not satisfied, then the second rule case (i.e., the rule case specified in the second row of rule cases) is evaluated against the values of the fields of the data element. If all of the conditions of the second rule case are satisfied, then the output of the rule set is a set of outputs 312 associated with the second rule case. This evaluation process continues until set of outputs is determined. Visually, the rule case associated with the output case includes no failed rule conditions, and therefore includes no shaded cells.

As is noted above, the user 110 can navigate through the elements of the dataset using a navigation control 304. Whenever the user 110 navigates to a different element using the navigation control 304, the UI module 106 executes the specified rule cases on the values of the newly selected element.

Furthermore, the user interface includes a test control 314, which permits the UI module 106 to apply the specified rule cases to all of the elements of the dataset. Upon completion of applying the rule cases to the dataset, the processing module 108 provides the results of applying the rule cases to the dataset to the UI module 108, which in turn displays the results in the user interface to the user 110. In some examples, a summary of the results are displayed to the user in a separate user interface (not shown).

Various alternative implementations can be used. For example, while the above description describes providing feedback to users by shading cells, other types of feedback mechanisms (e.g., sounds, pop-up windows, special symbols, etc.) can be utilized. The above description describes specifying rules while working on a full dataset. However, in some examples, a test dataset that has a reduced and more manageable size and is representative of a full dataset can be used.

The techniques described above can be implemented, for example, using a programmable computing system executing suitable software instructions or it can be implemented in suitable hardware such as a field-programmable gate array (FPGA) or in some hybrid form. For example, in a programmed approach the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. An apparatus for specifying one or more rules for processing data included in one or more fields of each element of a plurality of elements of a dataset, the apparatus including:
a user interface module configured to render a plurality of user interface elements associated with a respective condition, the user interface elements including
one or more first subsets of the user interface elements, at least some subsets of the one or more first subsets associated with an input value derived from at least one field of an element of the plurality of elements of the dataset, and
multiple second subsets of the user interface elements, each user interface element of one or more of the multiple second subsets configured to receive user input associated with a respective condition; and
a processing module, including at least one processor, configured to apply conditions to at least a first element of the dataset based on user input received from at least some of the user interface elements, in response to receiving user input for a first user interface element associated with a first field, where applying the conditions includes
compiling a selected portion of a specification of the rules to generate instructions for applying one or more selected conditions associated with fewer than all of the user interface elements, the selected conditions including at least a condition associated with the first user interface element, and
executing the generated instructions and providing feedback associated with a result based on applying the condition associated with the first user interface element to data included in the first field of the first element.

2. The apparatus of claim 1, wherein
the user interface elements are included in cells arranged in a grid having a first axis and a second axis,
the one or more first subsets of the user interface elements are included in respective subsets of the cells extending in a direction along the first axis of the grid, and
the multiple second subsets of the user interface elements are included in respective subsets of the cells extending in a direction along the second axis of the grid.

3. The apparatus of claim 2, wherein the processing module is further configured to:
generate a specification of an evaluation order for conditions associated with different cells; and
execute the generated instructions for applying the selected conditions according to the specification of the evaluation order, and provide feedback associated with results in response to applying the selected conditions to data included in one or more fields of the first element according to the specification of the evaluation order.

4. The apparatus of claim 3, wherein the specification of the evaluation order includes a state transition diagram that includes states representing different conditions and includes transitions among the states that define an order in which the conditions are allowed to be applied.

5. The apparatus of claim 2, wherein applying the conditions further includes:
storing the generated instructions; and
executing the stored generated instructions to apply the condition associated with the first user interface element to data included in the first field of a second element.

6. The apparatus of claim 2, wherein applying the conditions further includes:
storing the result based on applying the condition associated with the first user interface element to data included in the first field of the first element; and
retrieving the stored result in response to applying the condition associated with the first user interface element to data included in the first field of a second element that is the same as data included in the first field of the first element.

7. The apparatus of claim 2, wherein the one or more subsets of the cells extending in a direction along the first axis are columns of cells.

8. The apparatus of claim 2, wherein the multiple subsets of the cells extending in a direction along the second axis are rows of cells.

9. The apparatus of claim 2, wherein the result of applying the condition to the data included in the first field of the element includes a pass/fail result.

10. The apparatus of claim 9, wherein the providing feedback includes applying shading to the first user interface element if the result is a fail result.

11. The apparatus of claim 2, wherein applying the conditions further includes providing feedback associated with applying conditions associated with one or more cells to data included in multiple elements of the dataset.

12. The apparatus of claim 2, wherein the processing module is further configured to validate a syntax of a condition.

13. The apparatus of claim 12, wherein the at least some cells associated with a field and a validation rule provide feedback associated with the result of the validation of the syntax of the condition.

14. The apparatus of claim 1, wherein the dataset includes one or more tables of a database and the elements of the dataset include database records.

15. The apparatus of claim 1, wherein generating instructions for applying one or more conditions associated with fewer than all of the user interface elements includes generating instructions for applying selected conditions associated with respective user interface elements, the selected conditions consisting of a condition associated with the first user interface element and one or more additional conditions selected based on information specifying potential dependencies between different conditions.

16. The apparatus of claim 1, wherein the processing module is further configured to provide an output of evaluating a first set of existing instructions as part of the execution of the generated instructions, where the first set of existing instructions are for applying at least one condition other than the selected conditions, and the at least one condition depends on the condition associated with the first user interface element.

17. The apparatus of claim 16, wherein the processing module is further configured to re-execute a second set of existing instructions based on the result of executing the generated instructions.

18. A computing system for specifying one or more rules for processing data included in one or more fields of each element of a plurality of elements of a dataset, the computing system including:
   means for rendering a plurality of user interface elements associated with a respective condition, the user interface elements including
      one or more first subsets of the user interface elements, at least some subsets of the one or more first subsets associated with an input value derived from at least one field of an element of the plurality of elements of the dataset, and
      multiple second subsets of the user interface elements, each user interface element of one or more of the multiple second subsets configured to receive user input associated with a respective condition; and
   means for applying conditions to at least a first element of the dataset based on user input received from at least some of the user interface elements, in response to receiving user input for a first user interface element associated with a first field, where applying the conditions includes
      compiling a selected portion of a specification of the rules to generate instructions for applying one or more selected conditions associated with fewer than all of the user interface elements, the selected conditions including at least a condition associated with the first user interface element, and
      executing the generated instructions and providing feedback associated with a result based on applying the condition associated with the first user interface element to data included in the first field of the first element.

19. A method for specifying one or more rules for processing data included in one or more fields of each element of a plurality of elements of a dataset, the method including:
   rendering a plurality of user interface elements associated with a respective condition, the user interface elements including
      one or more first subsets of the user interface elements, at least some subsets of the one or more first subsets associated with an input value derived from at least one field of an element of the plurality of elements of the dataset, and
      multiple second subsets of the user interface elements, each user interface element of one or more of the multiple second subsets configured to receive user input associated with a respective condition; and
   applying conditions to at least a first element of the dataset based on user input received from at least some of the user interface elements, in response to receiving user input for a first user interface element associated with a first field, where applying the conditions includes
      compiling a selected portion of a specification of the rules to generate instructions for applying one or more selected conditions associated with fewer than all of the user interface elements, the selected conditions including at least a condition associated with the first user interface element, and
      executing the generated instructions and providing feedback associated with a result based on applying the condition associated with the first user interface element to data included in the first field of the first element.

20. The method of claim 19, wherein
   the user interface elements are included in cells arranged in a grid having a first axis and a second axis,
   the one or more first subsets of the user interface elements are included in respective subsets of the cells extending in a direction along the first axis of the grid, and
   the multiple second subsets of the user interface elements are included in respective subsets of the cells extending in a direction along the second axis of the grid.

21. The method of claim 20, further including:
   generating a specification of an evaluation order for conditions associated with different cells; and
   executing the generated instructions for applying the selected conditions according to the specification of the evaluation order, and providing feedback associated with results in response to applying the selected conditions to data included in one or more fields of the first element according to the specification of the evaluation order.

22. The method of claim 21, wherein the specification of the evaluation order includes a state transition diagram that includes states representing different conditions and includes transitions among the states that define an order in which the conditions are allowed to be applied.

23. The method of claim 20, wherein applying the conditions further includes:
   storing the generated instructions; and
   executing the stored generated instructions to apply the condition associated with the first user interface element to data included in the first field of a second element.

24. The method of claim 20, wherein applying the conditions further includes:
   storing the result based on applying the condition associated with the first user interface element to data included in the first field of the first element; and
   retrieving the stored result in response to applying the condition associated with the first user interface element to data included in the first field of a second element that is the same as data included in the first field of the first element.

25. The method of claim 20, wherein the result of applying the condition to the data included in the first field of the element includes a pass/fail result.

26. The method of claim 25, wherein the providing feedback includes applying shading to the first user interface element if the result is a fail result.

27. The method of claim 20, wherein applying the conditions further includes providing feedback associated with applying conditions associated with one or more cells to data included in multiple elements of the dataset.

28. The method of claim 20, further including validating a syntax of a condition.

29. The method of claim 28, wherein the at least some cells associated with a field and a validation rule provide feedback associated with the result of the validation of the syntax of the condition.

30. The method of claim 19, wherein generating instructions for applying one or more conditions associated with fewer than all of the user interface elements includes generating instructions for applying selected conditions associated with respective user interface elements, the selected conditions consisting of a condition associated with the first user interface element and one or more additional conditions selected based on information specifying potential dependencies between different conditions.

31. The method of claim 19, further including providing an output of evaluating a first set of existing instructions as part of the execution of the generated instructions, where the first set of existing instructions are for applying at least one condition other than the selected conditions, and the at least one condition depends on the condition associated with the first user interface element.

32. The method of claim 31, further including re-executing a second set of existing instructions based on the result of executing the generated instructions.

33. Software stored in a non-transitory form on a computer-readable medium, for specifying one or more rules for processing data included in one or more fields of each element of a plurality of elements of a dataset, the software including instructions for causing a computing system to:
   render a plurality of user interface elements associated with a respective condition, the user interface elements including
      one or more first subsets of the user interface elements, at least some subsets of the one or more first subsets associated with an input value derived from at least one field of an element of the plurality of elements of the dataset, and
      multiple second subsets of the user interface elements, each user interface element of one or more of the multiple second subsets configured to receive user input associated with a respective condition; and
   apply conditions to at least a first element of the dataset based on user input received from at least some of the user interface elements, in response to receiving user input for a first user interface element associated with a first field, where applying the conditions includes
      compiling a selected portion of a specification of the rules to generate instructions for applying one or more selected conditions associated with fewer than all of the user interface elements, the selected conditions including at least a condition associated with the first user interface element, and
      executing the generated instructions and providing feedback associated with a result based on applying the condition associated with the first user interface element to data included in the first field of the first element.

34. The software of claim 33, wherein
   the user interface elements are included in cells arranged in a grid having a first axis and a second axis,
   the one or more first subsets of the user interface elements are included in respective subsets of the cells extending in a direction along the first axis of the grid, and
   the multiple second subsets of the user interface elements are included in respective subsets of the cells extending in a direction along the second axis of the grid.

35. The software of claim 34, further including instructions for causing the computing system to:
   generate a specification of an evaluation order for conditions associated with different cells; and
   execute the generated instructions for applying the selected conditions according to the specification of the evaluation order, and provide feedback associated with results in response to applying the selected conditions to data included in one or more fields of the first element according to the specification of the evaluation order.

36. The software of claim 35, wherein the specification of the evaluation order includes a state transition diagram that includes states representing different conditions and includes transitions among the states that define an order in which the conditions are allowed to be applied.

37. The software of claim 34, wherein applying the conditions further includes:
   storing the generated instructions; and
   executing the stored generated instructions to apply the condition associated with the first user interface element to data included in the first field of a second element.

38. The software of claim 34, wherein applying the conditions further includes:
   storing the result based on applying the condition associated with the first user interface element to data included in the first field of the first element; and
   retrieving the stored result in response to applying the condition associated with the first user interface element to data included in the first field of a second element that is the same as data included in the first field of the first element.

39. The software of claim 34, wherein the result of applying the condition to the data included in the first field of the element includes a pass/fail result.

40. The software of claim 39, wherein the providing feedback includes applying shading to the first user interface element if the result is a fail result.

41. The software of claim 34, wherein applying the conditions further includes providing feedback associated with applying conditions associated with one or more cells to data included in multiple elements of the dataset.

42. The software of claim 34, further including instructions for causing the computing system to validate a syntax of a condition.

43. The software of claim 42, wherein the at least some cells associated with a field and a validation rule provide feedback associated with the result of the validation of the syntax of the condition.

44. The software of claim 33, wherein generating instructions for applying one or more conditions associated with fewer than all of the user interface elements includes generating instructions for applying selected conditions associated with respective user interface elements, the selected conditions consisting of a condition associated with the first user interface element and one or more additional conditions selected based on information specifying potential dependencies between different conditions.

45. The software of claim 33, further including instructions for causing the computing system to provide an output of evaluating a first set of existing instructions as part of the execution of the generated instructions, where the first set of existing instructions are for applying at least one condition other than the selected conditions, and the at least one condition depends on the condition associated with the first user interface element.

46. The software of claim 45, further including instructions for causing the computing system to re-execute a second set of existing instructions based on the result of executing the generated instructions.

\* \* \* \* \*